Patented Mar. 18, 1924.

1,487,205

UNITED STATES PATENT OFFICE.

JOHN N. CAROTHERS AND ARTHUR B. GERBER, OF ANNISTON, ALABAMA, ASSIGNORS TO FEDERAL PHOSPHORUS COMPANY, OF BIRMINGHAM, ALABAMA, A CORPORATION OF ALABAMA.

PROCESS FOR THE REMOVAL OF FLUORINE COMPOUNDS FROM PHOSPHORIC ACID.

No Drawing.   Application filed January 7, 1922.   Serial No. 527,686.

*To all whom it may concern:*

Be it known that we, JOHN N. CAROTHERS and ARTHUR B. GERBER, citizens of the United States of America, residing at Anniston, in the county of Calhoun and State of Alabama, have invented certain new and useful Improvements in Processes for the Removal of Fluorine Compounds from Phosphoric Acid, of which the following is a specification.

This invention relates to a process for the removal of fluorine compounds from phosphoric acid, and has for its object the production of a purified phosphoric acid of a high concentration, and low fluorine content. It has as a further object the application of a commercially economic method of purifying phosphoric acid.

The two general ways of producing phosphoric acid are: (1) by treating bone black, or phosphate rock with sulphuric acid; (2) smelting phosphate rock with sand and coke.

In the former process a relatively dilute acid is produced and the fluorine is removed during the concentration of this dilute acid. When phosphoric acid is produced by smelting phosphates, a stronger acid is produced and it is necessary to remove the fluorine in a different manner.

Nearly all phosphate rock contains a certain percentage of fluorine, usually as calcium fluoride. When such rock is decomposed in a smelting furnace, the fluorine is liberated and carried off with the phosphoric acid fume as part of the furnace gases. As the phosphoric acid fume condenses and forms a liquid, the fluorine dissolves to a certain extent and remains in the phosphoric acid when it is collected, notwithstanding the fact that the temperature of the phosphoric acid is between 100 and 200° C. when it is collected. This temperature is not sufficient, for the time the collected acid is in contact with the furnace gases, to remove the fluorine so as to make the phosphoric acid suitable for food purposes. Efforts have been made to remove the fluorine by bubbling air through the hot phosphoric acid, and although this will reduce the fluorine somewhat, the reduction is incomplete.

It is known that a chemical method has been proposed for the removal of fluorine compounds dissolved in phosphoric acid, according to the disclosure in United States Letters Patent No. 1,329,273, issued January 27th, 1920, when the fluorine is precipitated as fluorides, but the method proposed in our present process removes the fluorine as a different compound, and more completely than the process as referred to above.

In order that our present process may be understood and distinguished from existing processes, we will now describe our process and give the method of its operation. We propose to precipitate the fluorine with sodium silicate, or what is known in commerce as liquid glass. It is known that United States Patent No. 1,329,273 proposes to remove fluorine as fluorides by treating phosphoric acid with calcium chloride and sodium salts, and specifically mentions the chloride, carbonate, phosphate or hydroxide. Our work has shown that although these compounds do remove some of the fluorine in phosphoric acid, they do not remove it as completely as the silicate. In fact, it seems that the fluorine removal, when sodium carbonate is added, is due to small quantities of silicate in solution where the sodium carbonate supplies the necessary sodium to form a precipitate which probably is composed of sodium, silica and fluorine. We have found that glass caused a precipitate to form in phosphoric acid which has been treated with sodium carbonate out of contact with glass for the elimination of fluorine; but that the acid would remain clear so long as kept out of contact with glass. This occurrence led to an investigation as to the cause of this precipitate and it finally was proved that no such precipitate occurred in phosphoric acid which has been treated with sodium phosphate or carbonate for the removal of fluorine, even on long standing out of contact with glass, but that a precipitate would form in a few minutes in case the acid were in glass. A series of tests were conducted to ascertain what caused the precipitate and, as a result, it was shown that a combination of silica and sodium as liquid glass would cause a precipitate, while if used separately, only a slight fluorine reduction was observed with sodium phosphate, carbonate, chloride or hydroxide, and no reduction whatever with silica.

The following examples give specific cases with the results obtained. A sample of phosphoric acid of a specific gravity 1.63 contained .148% fluorine and was treated with enough sodium carbonate to supply 100% excess sodium over that necessary to convert all the fluorine into sodium fluoride and the fluorine in the treated acid analyzed .121%. In order to make a concrete comparison, a test was made on two samples of acid, equal weight of acid treated in one case with sodium carbonate, and the other with sodium silicate with the following result: A sample of 1,000 parts 1.525 specific gravity phosphoric acid containing .082 parts fluorine was treated with 5. parts sodium carbonate, and showed on analysis of the treated acid .064 parts fluorine; another portion of 1,000 parts 1.525 specific gravity phosphoric acid containing .082 parts fluorine was treated with 1. part sodium silicate showed on analysis .037 parts fluorine. In the first case the treated acid became cloudy on standing in glassware, while the latter case the acid remained clear.

If the silicate of soda be as a strong solution when added to the acid, a jelly-like formation takes place, and it is only with great difficulty that this is broken up and put into solution. Then if too much silicate of soda be added, the entire mass of acid and all forms a jelly-like mass. This formation is an objectional feature and is to be avoided. However, no such formation is observed if the silicate be added slowly in a dilute solution, and not in excess. And it has developed to be good practice to add this silicate as a dilute solution in which a pound of commercial silicate is dissolved in about nine pounds of water. This solution is then added gradually so as to prevent the jelly-like formation referred to above.

After the fluorine compounds have precipitated, they may be removed by any of the well known methods for removing sediment from acids. In the present practice, it is removed by allowing the acid to percolate through a bed of fine, clean sand. The solid particles remain as a thin coat on top of the sand, and clear acid is collected as it flows away from the sand bed.

In the application of this process, on a large scale treatment of phosphoric acid, about 10,000 pounds of acid of 1.70 specific gravity is treated with about twenty pounds sodium silicate dissolved in twenty gallons of water added slowly, as above described, and the fluorine in the phosphoric acid is reduced from approximately .2% to .020% fluorine.

Having thus described our invention, what we claim as new and desire to secure by Letters Patent, is:—

1. A process for the elimination of hydrofluoric acid from an aqueous solution of hydrofluoric acid and phosphoric acid, which consists in adding to said solution a silicate, and precipitating a fluorine compound, substantially as described.

2. A process for the elimination of hydrofluoric acid from an aqueous solution of hydrofluoric acid and phosphoric acid, which consists in adding to said solution a silicate solution, and precipitating a fluorine compound, substantially as described.

3. A process for the elimination of hydrofluoric acid from an aqueous solution of hydrofluoric acid and phosphoric acid, which consists in adding to said solution a sodium silicate, then mixing and subsequently precipitating a fluorine compound, substantially as described.

4. A process for the elimination of hydrofluoric acid from an aqueous solution of hydrofluoric acid and phosphoric acid, which consists in adding to said solution a sodium silicate solution, then mixing and precipitating a fluorine compound, substantially as described.

5. A process for the elimination of hydrofluoric acid from an aqueous solution of hydrofluoric acid and phosphoric acid, which consists in adding slowly to said solution a dilute solution of sodium silicate, then mixing and precipitating a fluorine compound, substantially as described.

6. A process for the elimination of hydrofluoric acid from an aqueous solution of hydrofluoric acid and phosphoric acid, which consists in adding to said solution a dilute solution of sodium silicate in quantity not substantially in excess of that required to precipitate the fluorine compound present in said aqueous solution, mixing said solutions, and precipitating a fluorine compound, substantially as described.

7. A process for the removal of hydrofluoric acid from an aqueous solution of hydrofluoric acid and strong phosphoric acid, which consists in adding slowly to said solution a dilute solution of sodium silicate in quantity not substantially in excess of that required to precipitate the fluorine present in combination in said aqueous solution, mixing the acid and silicate of soda solutions, precipitating a fluorine compound, and removing the precipitated fluorine compound, substantially as described.

In testimony whereof we affix our signatures,

JOHN N. CAROTHERS.
ARTHUR B. GERBER.

Witness:
C. M. JEFFERSON.